UNITED STATES PATENT OFFICE 2,544,076

QUATERNARY AMMONIUM SALTS OF DI- AND TRI-(DIALKYLAMINOALKOXY)-BENZENES

Ernest Fourneau, Paris, France, assignor to Societe des Usines Chimiques Rhone-Poulenc, Paris, France, a corporation of France No Drawing. Application June 21, 1948, Serial No. 34,349. In France July 2, 1947

6 Claims. (Cl. 260—567.6)

This invention relates to quaternary ammonium salts of di- and tri-(dialkylamino-alkoxy)-benzenes and particularly to such quaternary salts of the following general formulae:

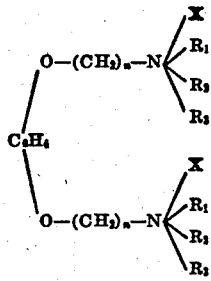

or

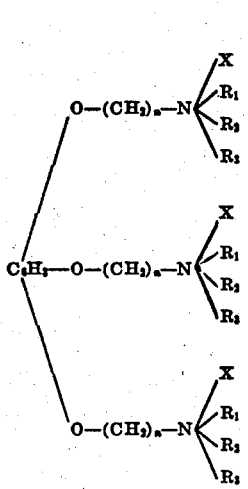

wherein $R_1$, $R_2$ and $R_3$ are the same or different and are lower alkyl residues (e. g. containing up to 4 carbon atoms), X is a halogen atom or other acid residue and $n$ is an integer greater than 1, e. g. 2.

According to the present invention, these substances are obtained by heating together alkyl esters of the general formula $R_3X$ and tertiary bases of the general formula:

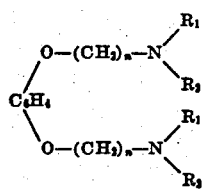

or

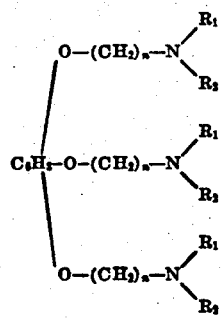

These tertiary bases can readily be obtained by reacting sodium derivatives of di- and trihydroxy-benzenes with halogenated tertiary amines of the general formula:

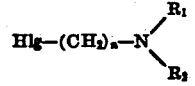

Hlg representing a halogen atom.

The quaternary salts obtained in accordance with the present invention exhibit very pure curarising properties and are therefore of considerable value as therapeutic agents.

The following example serves to illustrate the invention but is not to be regarded as limiting the invention in any way.

Example 20 g. of 1.2.3-tri-(β-diethylaminoethoxy)-benzene is heated for 5 hours under reflux on the water bath with 30 g. of ethyl iodide. The hot mixture is dissolved in 50 cc. of water, filtered after addition of 2 g. of decolorising black, evaporated to dryness on the water bath and recrystallised from 120 cc. of alcohol. The product can be further recrystallised in mixtures of acetone and water.

The tri-ethiodide of 1.2.3-tri-(β-diethylaminoethoxy)-benzene is thus obtained as white crystals which, after drying, have a rather indefinite melting point at about 152-153° C. (Maquenne block).

The initial 1.2.3-tri-(β-diethylaminoethoxy)-benzene can be obtained in the following manner.

12.6 g. of pyrogallol are dissolved in 100 cc. of hot toluene. 14 g. of sodamide (85%) are added to the solution at about 100° C. in 5 portions over a period of 15 minutes, with agitation.

There are then added with agitation, over a period of 30 minutes, 100 cc. of a toluene solution containing 474 g. of diethylamino-chlorethane per litre of toluene.

The mixture is then heated for one hour, the toluene being refluxed, whereafter it is left to cool, 50 cc. of water are added and, after decanting, the solution is again washed with two quantities of 50 cc. of water. The toluene solution is dried over potassium carbonate and distilled in vacuo. There is thus obtained 28 g. of 1.2.3-tri-(β-diethylamino-ethoxy)-benzene, boiling at 206° C. under 1 mm. pressure.

Following the procedure set forth in the foregoing example, the following products can also be prepared:

Di-ethiodide of 1.2-di-(β-dimethylaminoethoxy)-benzene, M. P. 129–130° C.
Di-methiodide of 1.2-di-(β-diethylaminoethoxy)-benzene, M. P. 115–120° C. (indefinite)
Di-ethiodide of 1.2-di-(β-diethylaminoethoxy)-benzene, M. P. 184° C.
Di-methiodide of 1.3-di-(β-dimethylaminoethoxy)-benzene, M. P. 227° C.
Di-ethiodide of 1.3-di-(β-dimethylaminoethoxy)-benzene, M. P. 163–164° C.
Di-methiodide of 1.3-di-(β-diethylaminoethoxy)-benzene, M. P. 120° C. (indefinite)
Di-ethiodide of 1.3-di-(β-diethylaminoethoxy)-benzene, M. P. 159–160° C.
Di-methiodide of 1.4-di-(β-diethylaminoethoxy)-benzene, M. P. 212° C.
Di-ethiodide of 1.4-di-(β-diethylaminoethoxy)-benzene, M. P. 238° C.
Tri-ethiodide of 1.2.4-tri-(β-diethylaminoethoxy)-benzene, M. P. about 125° C. (indefinite)

I claim:

1. A quaternary lower alkyl iodide of a compound containing a benzene nucleus substituted solely by a number greater than one and less than four of substituent groups each of which is a di-lower-alkyl aminoalkoxy group.

2. A quaternary lower alkyl iodide of a di-(di-lower-alkyl-amino-alkoxy)-benzene, in which the alkoxy groups contained in the di-lower-alkyl-amino-alkoxy substituents each contain more than one carbon atom and the said di-lower-alkyl-amino-alkoxy substituents are the sole substituents on the benzene nucleus.

3. A quaternary lower alkyl iodide of a tri-(di-lower-alkyl-amino-alkoxy)-benzene, in which the alkoxy groups contained in the di-lower-alkyl-amino-alkoxy substituents each contain more than one carbon atom and the said di-lower-alkyl-amino-alkoxy substituents are the sole substituents on the benzene nucleus.

4. A quaternary lower alkyl iodide of a di-(di-lower-alkylaminoethoxy)-benzene in which the di-lower-alkyl-amino-ethoxy substituents are the sole substituents on the benzene nucleus.

5. A quaternary lower alkyl iodide of a tri-(di-lower-alkylaminoethoxy)-benzene in which the di-lower-alkyl-amino-ethoxy substituents are the sole substituents on the benzene nucleus.

6. The tri-ethiodide of 1:2:3-tri-(β-diethylaminoethoxy)-benzene.

ERNEST FOURNEAU.

REFERENCES CITED

The following references are of record in the file of this patent:

Bovet et al.: Comptes Rendus, vol. 225, July 7, 1947, pp. 74 to 76.
Chapman et al.: J. Am. Pharm. Assoc., vol. 36 (1947), pp. 78 and 79.
Chemical Abstracts, vol. 41 (1947), page 7436d.
Ser. No. 404,519, Schlussler (A. P. C.), published April 20, 1943.